(12) United States Patent
Choi

(10) Patent No.: US 9,371,947 B2
(45) Date of Patent: Jun. 21, 2016

(54) BRANCH PIPE

(76) Inventor: Yuk Nam Choi, Bucheon-si (KR)

( * ) Notice: Subject to any disclaimer, the term of this patent is extended or adjusted under 35 U.S.C. 154(b) by 251 days.

(21) Appl. No.: 13/580,149

(22) PCT Filed: Feb. 18, 2011

(86) PCT No.: PCT/KR2011/001088
§ 371 (c)(1),
(2), (4) Date: Aug. 20, 2012

(87) PCT Pub. No.: WO2011/102669
PCT Pub. Date: Aug. 25, 2011

(65) Prior Publication Data
US 2012/0312404 A1 Dec. 13, 2012

(30) Foreign Application Priority Data
Feb. 19, 2010 (KR) .................. 20-2010-0001802 U

(51) Int. Cl.
| | | |
|---|---|---|
| *E03B 7/07* | (2006.01) | |
| *F16K 11/22* | (2006.01) | |
| *F16L 47/12* | (2006.01) | |
| *F16L 47/16* | (2006.01) | |
| *F16L 19/065* | (2006.01) | |
| *F16L 37/092* | (2006.01) | |
| *F16L 37/244* | (2006.01) | |
| *F16L 37/252* | (2006.01) | |
| *F16L 41/02* | (2006.01) | |

(Continued)

(52) U.S. Cl.
CPC .......... *F16L 19/065* (2013.01); *F16L 37/0925* (2013.01); *F16L 37/2445* (2013.01); *F16L 37/252* (2013.01); *F16L 41/021* (2013.01); *F16L 41/03* (2013.01); *F24D 3/1075* (2013.01); *F24D 19/0097* (2013.01); *Y10T 137/87877* (2015.04)

(58) Field of Classification Search
CPC .............................. F16L 19/065; F16L 37/252
USPC .................... 137/551–559, 883, 887; 40/658; 285/247–249, 257, 323, 354, 386; 248/62, 68.1
See application file for complete search history.

(56) References Cited

U.S. PATENT DOCUMENTS 1,025,243 A * 5/1912 Carpenter et al. ............. 248/58
2,460,653 A * 2/1949 Raybould .................... 285/249

(Continued)

FOREIGN PATENT DOCUMENTS

JP 2009-150450 7/2009
KR 20-1990-0015962 9/1990

(Continued)

OTHER PUBLICATIONS

International Search Report for PCT/KR2011/001088 Mailed on Oct. 6, 2011.

*Primary Examiner* — Marina Tietjen
*Assistant Examiner* — Seth W MacKay-Smith
(74) *Attorney, Agent, or Firm* — STIP Law Group, LLC

(57) ABSTRACT

The manifold type pipe structure according to the present invention is characterized in that at least branch pipe is formed at a pipe passage having a flow hole through which fluid flows, and an input coupling part is formed at an end of the pipe passage, and a joint coupler forming an output coupling part at the other end is prepared, and an output coupling part of a joint coupler of the other places is joint-connected with a limited rotation angle at an input coupling part of at least one joint coupler.

9 Claims, 16 Drawing Sheets

(51) Int. Cl.
*F16L 41/03* (2006.01)
*F24D 3/10* (2006.01)
*F24D 19/00* (2006.01)

(56) References Cited

U.S. PATENT DOCUMENTS

| | | | | |
|---|---|---|---|---|
| 3,322,381 | A * | 5/1967 | Bubb | 248/121 |
| 3,432,128 | A * | 3/1969 | Elleboudt | 248/68.1 |
| 3,709,248 | A | 1/1973 | Aurich et al. | 137/271 |
| 4,100,940 | A * | 7/1978 | Spears | 137/877 |
| 4,244,542 | A * | 1/1981 | Mathews | 248/49 |
| 4,427,218 | A * | 1/1984 | Duvet et al. | 285/184 |
| 4,431,216 | A * | 2/1984 | Legris | 285/104 |
| 4,465,094 | A * | 8/1984 | Huffhines et al. | 137/557 |
| 4,575,274 | A * | 3/1986 | Hayward | 403/2 |
| 4,807,911 | A * | 2/1989 | Short | 285/323 |
| 4,848,391 | A * | 7/1989 | Miller et al. | 137/270 |
| 4,927,103 | A * | 5/1990 | Nicholson | 248/62 |
| 5,215,281 | A * | 6/1993 | Sherman | 248/74.1 |
| 5,375,887 | A * | 12/1994 | Johnson | 285/12 |
| 5,715,692 | A * | 2/1998 | Pappas | 62/129 |
| 6,058,975 | A * | 5/2000 | Hui-Chen | 137/883 |
| 6,568,713 | B1 * | 5/2003 | Bruvry et al. | 285/133.21 |
| 6,892,990 | B2 * | 5/2005 | Pisczak | 248/74.4 |
| 6,929,032 | B2 * | 8/2005 | Rehder et al. | 137/884 |
| 7,044,147 | B2 * | 5/2006 | Enicks et al. | 137/1 |
| 7,111,644 | B2 * | 9/2006 | Rehder et al. | 137/884 |
| 7,194,829 | B2 * | 3/2007 | Boire et al. | 40/316 |
| 7,216,672 | B1 * | 5/2007 | Chen | 137/883 |
| 7,354,079 | B2 * | 4/2008 | Rehder et al. | 285/322 |
| 7,964,796 | B2 * | 6/2011 | Suzuki | 174/72 C |
| 8,240,715 | B2 * | 8/2012 | Itou et al. | 285/92 |
| D675,715 | S * | 2/2013 | McKenzie | D23/266 |
| 2002/0163181 | A1 * | 11/2002 | Russell | 285/41 |
| 2003/0102039 | A1 * | 6/2003 | Marzorati | 137/883 |
| 2007/0267869 | A1 * | 11/2007 | Patel | 285/386 |
| 2008/0185483 | A1 * | 8/2008 | Rapp et al. | 248/68.1 |
| 2009/0199918 | A1 * | 8/2009 | Steinfels et al. | 137/881 |
| 2009/0267345 | A1 * | 10/2009 | Choi | 285/309 |

FOREIGN PATENT DOCUMENTS

| | | |
|---|---|---|
| KR | 20-1999-0015834 | 5/1999 |
| KR | 20-2000-0003413 | 2/2000 |
| KR | 10-2000-0013688 | 3/2000 |
| KR | 20-0417942 | 5/2006 |

* cited by examiner (a)

(b)

BRANCH PIPE

RELATED APPLICATIONS

This application is a 371 application of International Application No. PCT/KR2011/001088, filed Feb. 18, 2011, which in turn claims priority from Korean Patent Application No. 20-2010-0001802, filed Feb. 19, 2010, each of which is incorporated herein by reference in its entirety.

TECHNICAL FIELD

The present invention elates to a manifold type pipe structure, and in particular to a manifold type pipe structure which makes it possible to easily couple branch pipes with a limited rotation angle while ensuring airtight connections.

BACKGROUND ART

A hot water distribution pipe for a boiler is generally configured in such a way that an inlet and outlet port is formed at an end of a branch pipe body, and distribution ports are formed at an outer surface of it, and the inlet and outlet port communicates with a boiler body, and the distribution ports communicate with heating pipes connected to an indoor compartment. A threaded portion is formed at the inner surfaces and the outer surfaces of the inlet and outlet port and the distribution ports, respectively. A water transfer pipe or a water return pipe is connected to the inlet and outlet port, and a heating pipe communicates with the distribution ports.

The above mentioned hot water distribution pipe for a boiler is configured in such a way that a nut is engaged after a sealing vinyl or a thread is wound on the outer surfaces of the distribution port or the inlet and outlet port. To the opposite side of the nut is connected a water transfer pipe or a water return pipe or a heating pipe. Heating water from the boiler body is supplied to the distribution pipe body via the inlet and outlet port. Heating water is inputted into the heating pipes connected to each indoor compartment via the distribution ports.

However, the above mentioned conventional hot water distribution pipe is configured in such a way that the threads are formed on the outer surfaces of the inlet and outlet port and the distribution ports which helps an airtight communication with the water transfer pipe and the water return pipe and the heating pipe, and a plurality of nuts are coupled after a sealing member is engaged, so the structure is complicated, and a construction work is hard, and the construction costs a lot.

Disclosure of Invention

Accordingly, it is an object of the present invention to provide a manifold type pipe structure which makes it possible to couple distribution pipes in series at limited angles.

It is another object of the present invention to provide a manifold type pipe structure which can be concurrently adapted to a double type method of coupling a pipe at both ends in a pipe structure and a single type method coupling a pipe at one end of both ends.

It is further another object of the present invention to provide a manifold type pipe structure which makes it possible to obtain an airtight connection even with a rotation at an acute angle when connecting, in series, branch pipes at limited angles.

To achieve the above objects, there is provided a manifold type pipe structure, comprising at least one branch pipe which is formed at a pipe passage having a flow hole through which fluid flows; an input coupling part which is formed at an end of the pipe passage; a joint coupler which forms an output coupling part at the other end of the pipe passage; and an output coupling part of the joint coupler of other places which is joint-connected with a limited rotation angle at the input coupling part of the joint coupler which is provided as many as at least one.

According to the present invention, the joint coupler includes a pipe coupler for achieving a joint connection with the pipe, the pipe coupler forming at least one branch pipe at the pipe passage having a flow hole through which fluid flows, with a connection valve being installed at an end of the branch pipe, with a connection valve being formed at an end of the pipe passage for the purpose of engaging the pipes, with an output coupling part being formed at the other end of it.

According to the present invention, there is further provided a finishing coupler which is connected with the joint coupler, with the finishing coupler forming at least one branch pipe at a passage pipe having in its interior a flow hole through which liquid flows, with a connection valve being installed at an end of the branch pipe valve, with the input coupling part being formed at an end of the pipe passage for thereby being joint-connected with a limited rotation angle with the output coupling part of the joint coupler or the pipe coupler, the other end of it being closed.

According to the present invention, the pipe coupler includes at least one branch pipe at a pipe passage having a flow hole through which fluid flows, with a connection valve being installed at an end of the branch pipe, with a connection valve being formed at an end of the pipe passage for engaging the pipes, the other end being configured to seal the flow hole.

According to the present invention, the pipe coupler forms at least one branch pipe at a pipe passage having a flow hole through which fluid flows, a connection valve being formed at an end of the branch pipe, with a connection valve being formed at both sides of the pipe passage for engaging the pipes.

According to the present invention, the finishing coupler forms at least one branch pipe at a pipe passage having a flow hole through which fluid flows, and a connection valve is formed at an endof the branch pipe, and a connection valve joint-connected with the pipe is formed at an endof the pipe passage.

According to the present invention, the input coupling part forms a coupling means at regular intervals on an outer surface of one side of both sides of the pipe passage, and the coupling means forms an engaging protrusion in a curvature direction of an outer surface of the pipe passage, and the engaging protrusion is provided in multiple numbers and is spaced apart at regular intervals for thereby forming an engaging space between the engaging protrusions, and the engaging space formed opposite to the rotation direction of the pipe passage is sealed, and the output coupling part form an engaging means at regular intervals on an inner surface of one side of both sides of the pipe passage, and the engaging means forms a plurality of engaging protrusions which are spaced apart in a curvature direction of the inner surface of the pipe passage, and when the input coupling part and the output coupling part are joint-connected, the coupling protrusion of the input coupling part is inserted up to the sealed portion of the engaging space, so the input coupling part and the output coupling part are coupled with a limited rotation angle, and a locking protrusion is formed at an inner surface of the opening of the pipe passage where the coupling means is formed and at a backside of the engaging means for thereby maintaining a joint state as the locking protrusions are engaged when jointing the input coupling part and the output coupling part.

According to the present invention, the connection valve comprises a coupling portion 170 which is configured to have a female thread 151a on an inner surface to be engaged with a male tread 111 formed on an outer surface of the pipe passage, and an engaging hole 151b having a multi-stepped inner surface is formed at the center of the inner side to communicate with the flow hole 101, and at the center of the engaging hole 151b is formed a first slope surface 151c having a shoulder, and at an end of the engaging hole 151b are continuously formed a plurality of engaging protrusions 151d, and when being engaged to the male thread 111 of the pipe passage 110, it is engaged with the fixing shoulder 112 formed at a backside of the male thread 111; and a pressurizing portion 152 which is configured in such a way that a support shoulder 152a is formed at an outer surface of one side so as to be inserted into the engaging hole 151b, and the pressurizing piece 152e having a pressurizing space 152b passing through the interior is partially cut away at regular intervals for thereby inserting the pipe into the pressurizing space 152b, and then when the pipe 11 is pulled in a reverse direction, the pressurizing piece 152e is inserted into the first slope surface 151c and is inwardly contracted for thereby pressurizing an outer surface of the pipe 11, so the pipe passage 110 and the pipe are jointed and connected.

According to the present invention, the connection valve comprises a connection portion 153 engaged to communicate with an inner surface of the branch pipe 120; a coupling portion 151 which is coupled at an end of the connection portion 153 and has an engaging hole 151b having a multi-stepped surface at an inner surface and forms a first slope surface 151c at the engaging hole 151b; and a pressurizing portion 152 which has a support shoulder 181 at an outer surface of one side to be inserted into the engaging hole 123, and the pressurizing piece 152e having a pressurizing space 152b passing through the interior is partially cut away at regular intervals, and when the pipes are inserted into the pressurizing space 152b, it comes into the interior from the engaging space 153b, and the pressurizing piece 152e pressurizes an outer surface of the pipe passage, and the end of the pressurizing piece 152e is caught at the first slope surface 151c of the engaging portion 151, so the pipe passage 110 and the pipes are jointed and connected.

According to the present invention, there is further provided an indication portion which is engaged to an outer surface of the pipe passage for indicating a connection place of the branch pipes, the indication portion comprising a main passage of which a lower side is open and which has a space in a longitudinal direction; a sub passage which is formed depending on the number of the branch pipes in a horizontal direction from the main passage; and a clip which is partially cut away in a vertical and downward direction at the center of the main passage for thereby being elastically engaged to an outer surface of the pipe passage.

According to the present invention, there is further provided a fixing portion for installing the pipe passage on the ground or the wall, the fixing portion including a bracket having a fixing hole on the ground for being fixed on the ground or the wall; a lower fixture which is integrally formed with the bracket and forms a fixing groove at both sides of the holder of which an upper side is open; and an upper fixture of which a lower side is open to be engaged from an upper side of an outer surface of the space between a pair of the fixing shoulders of the outer surface of the pipe passage, with the fixing protrusion formed at both sides of a lower side of the being inserted into the fixing groove.

According to the present invention, the joint coupler, the finishing coupler and the pipe coupler are made from at least one of the groups comprising polyamide, polyester, polycarbonate, polyterephthalic acid butylene and poly oxide phenylene.

Advantageous Effects

As described above, the manifold type pipe structure according to the present invention is directed to easily coupling branch pipes in such a way that the branch pipes are easily coupled with limited rotation angles, not adapting a conventional thread coupling method for thereby preventing any interference from branch pipes during a coupling.

In addition, the manifold type pipe structure according to the present invention is directed to enhancing the compatibility of pipes in such a way to concurrently adapt a double type method of coupling a pipe at both ends in terms of pipes and a single type method coupling a pipe at one end of both ends.

In addition, the manifold type pipe structure according to the present invention is directed to enhancing the efficiency of work with the aid of a faster coupling in such a way to couple branch pipes in an airtight coupling method with only the rotations in an acute angle range when coupling, in series, branch pipes with limited rotation angles.

The manifold type pipe structure according to the present invention ensures good heat resistance performance, desired strength and impact and abrasion resistance performances since it is made from an engineering plastic as a principle material and makes it possible save a manufacture cost since the manifold type pipe structure is made in an extrusion molding method.

Figure 1:
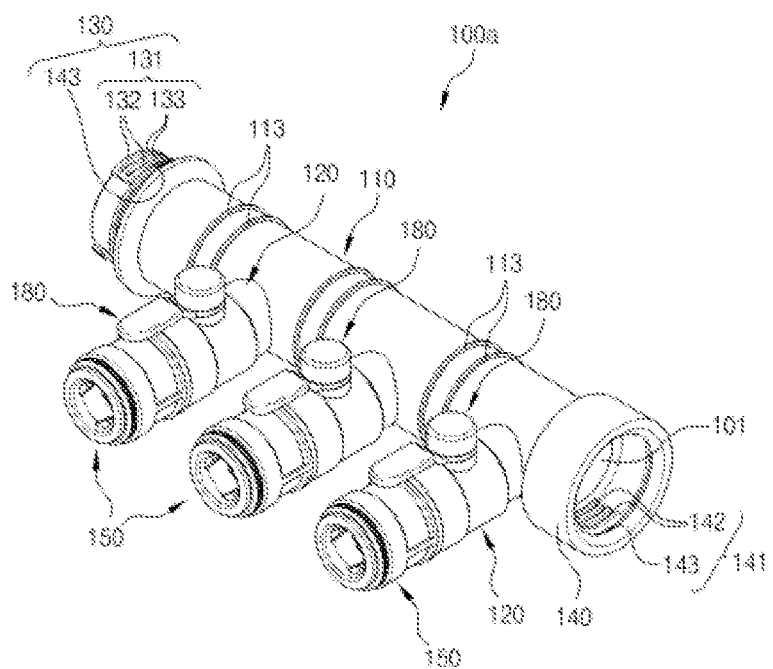
FIG. 1 is a perspective view illustrating a joint coupler of a manifold type pipe structure according to the present invention.

| 10: manifold type pipe structure | 11: pipe |
| 100a: joint coupler | 100b: pipe coupler |
| 100c: finishing coupler | 101: flow hole |
| 110: pipe passage | 111: male thread |
| 112: fixing shoulder | 113: fixing shoulder |
| 113: joint fixing shoulder | 120: distribution pipe |
| 130: input coupling part | |
| 131: coupling portion | 132: engaging protrusion |
| 133: engaging space | 140: output coupling part |
| 141: engaging portion | 142: coupling protrusion |
| 143: locking protrusion | 150: connection valve |
| 151: coupling portion | 151a: female thread |
| 151b: engaging hole | 151c: first slope surface |
| 151d: engaging protrusion | 152: pressurizing portion |
| 152a: support shoulder | 152b: pressurizing space |
| 152e: pressurizing piece | 153: connection portion |
| 160: indication portion | 161: main passage |
| 162: sub passage | 163: clip |
| 170: fixing portion | 171: lower fixture |
| 171a: bracket | 171b: fixing hole |
| 171c: holder | 171d: fixing groove |
| 172: upper fixture | 172a: fixing protrusion |
| 173: joint groove | |
| 180: ball valve | |

MODES FOR CARRYING OUT THE INVENTION

The preferred embodiments of the present invention will be described with reference to the accompanying drawings.

It is noted that the same elements or parts shown in the drawing are given the same reference numerals, and in the following descriptions, the descriptions on the known functions or constructions will be omitted for simplification.

Figure 2:
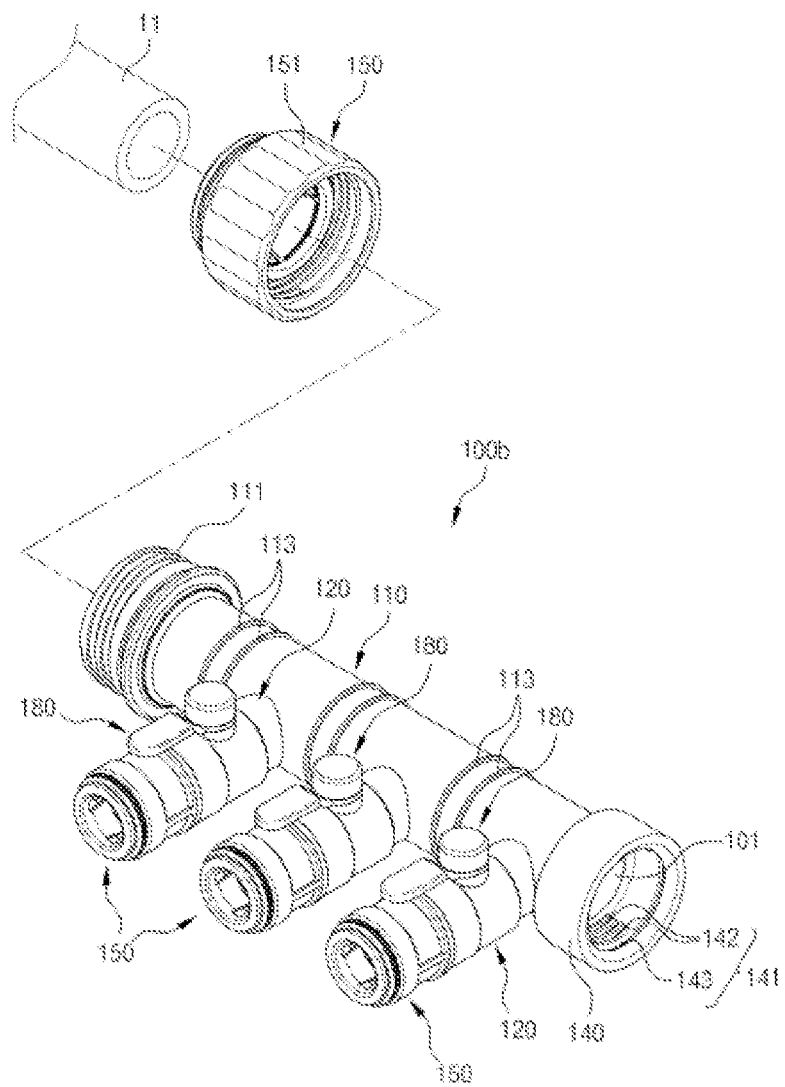
FIG. 2 is a perspective view illustrating a pipe coupler of a manifold type pipe structure according to the present invention.
Figure 3:
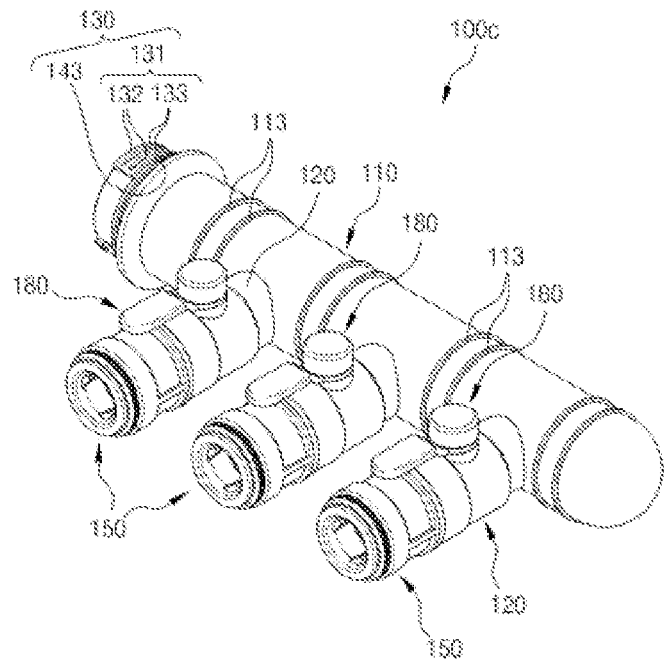
FIG. 3 is a perspective view illustrating a finishing coupler of a manifold type pipe structure according to the present invention.
Figure 4:
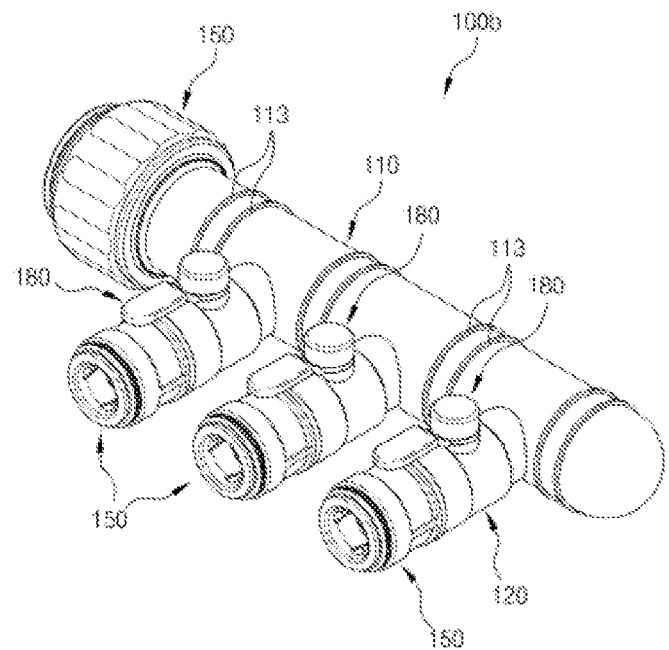
FIG. 4 is a perspective view illustrating a pipe coupler of a manifold type pipe structure according to a first embodiment of the present invention.
Figure 5:
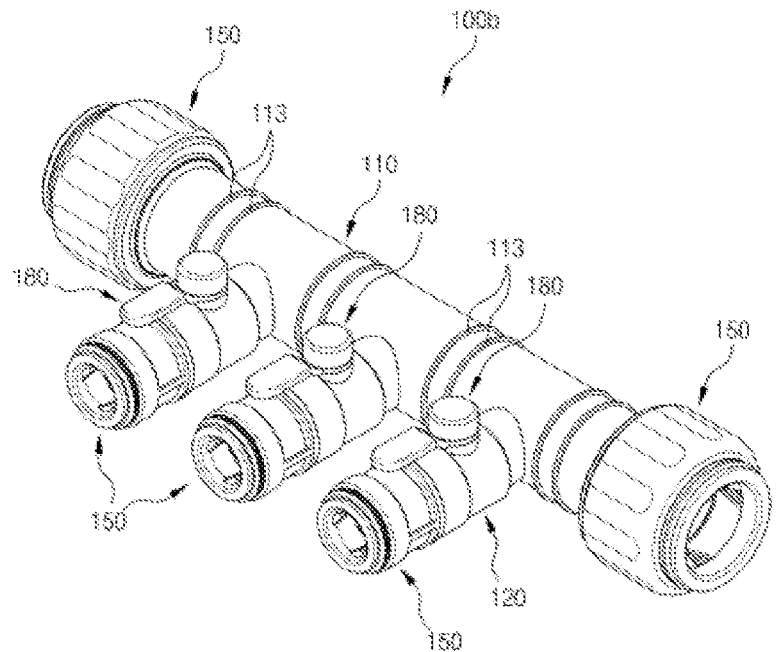
FIG. 5 is a perspective view illustrating a pipe coupler of a manifold type pipe structure according to a second embodiment of the present invention.
Figure 6:
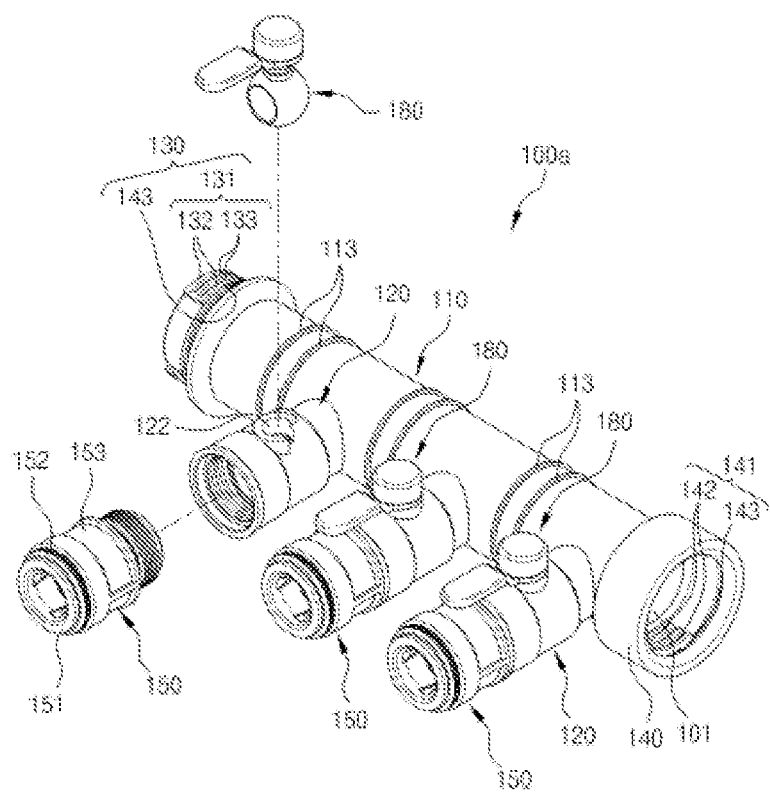
FIG. 6 is a partially disassembled perspective view illustrating a joint coupler of a manifold type pipe structure according to the present invention.
Figure 7:
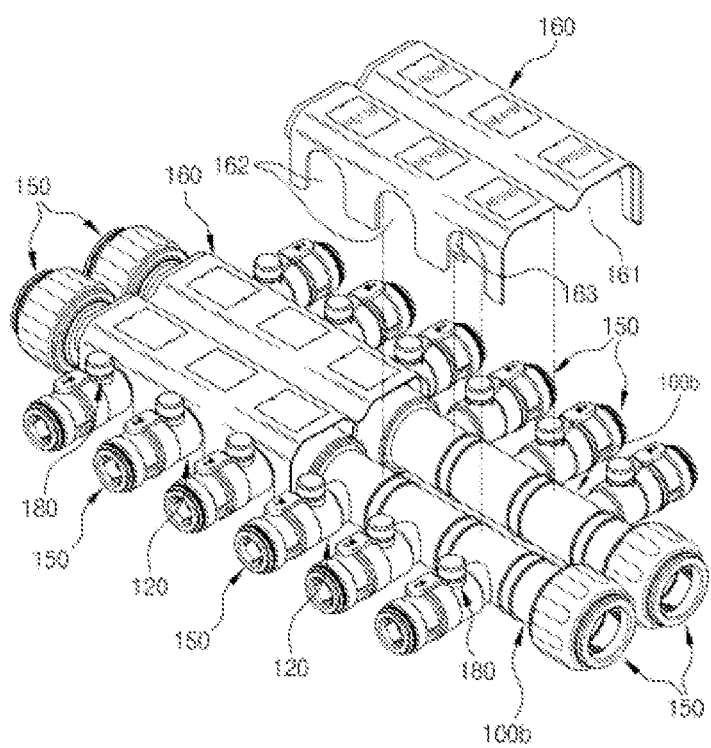
FIG. 7 is a view of a use state of a pipe coupler of a manifold type pipe structure according to the present invention.
Figure 8:
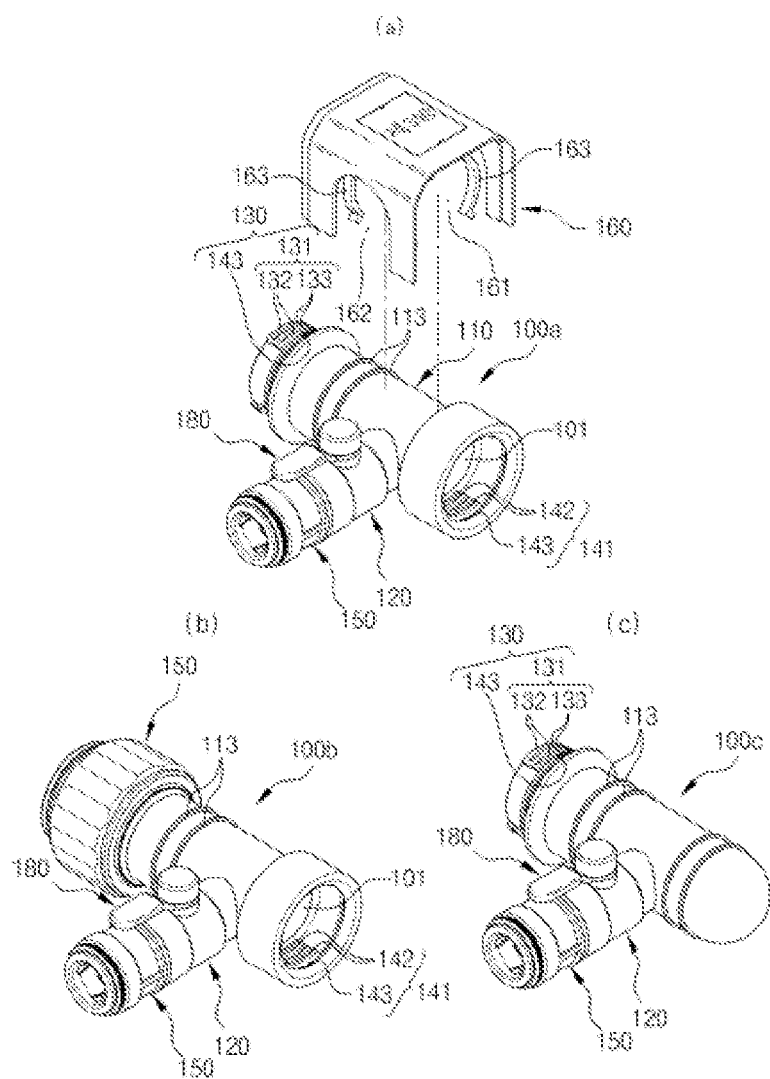
FIG. 8 is a perspective view illustrating a manifold type pipe structure with one branch pipe in a manifold type pipe structure according to the present invention.
Figure 9:
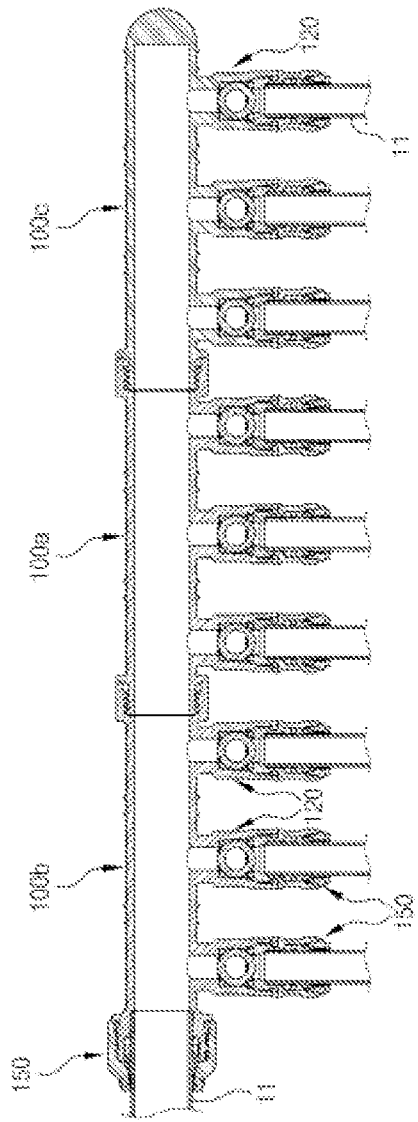
FIG. 9 is a cross sectional view illustrating a manifold type pipe structure according to the present invention.
Figure 10:
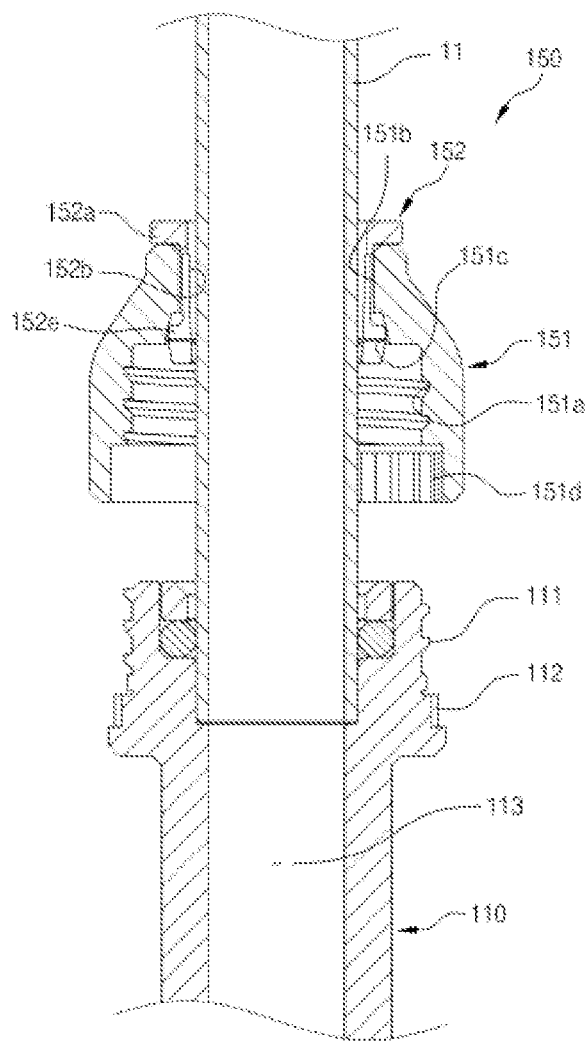
FIG. 10 is a cross sectional view illustrating a state before an engagement of a connection valve connected to a pipe in a manifold type pipe structure according to the present invention.
Figure 11:
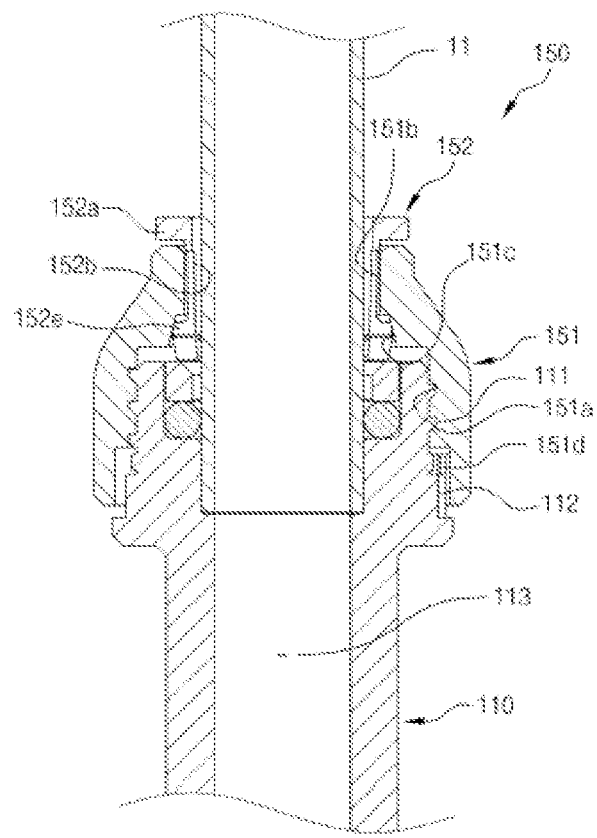
FIG. 11 is a cross sectional view illustrating a state after an engagement of a connection valve connected to a pipe in a manifold type pipe structure according to the present invention.
Figure 12:
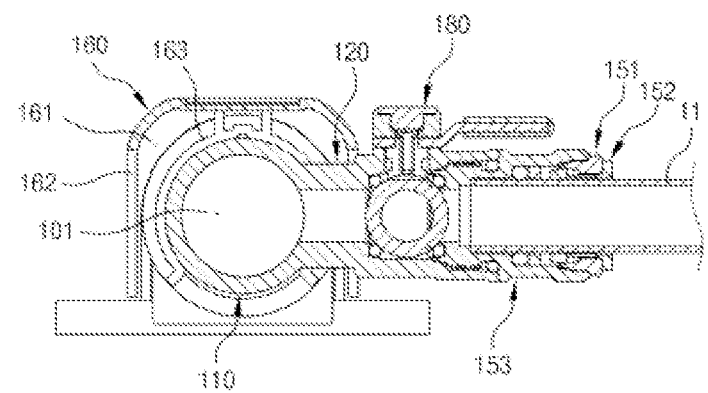
FIG. 12 is a vertical cross sectional view illustrating a manifold type pipe structure according to the present invention.
Figure 13:
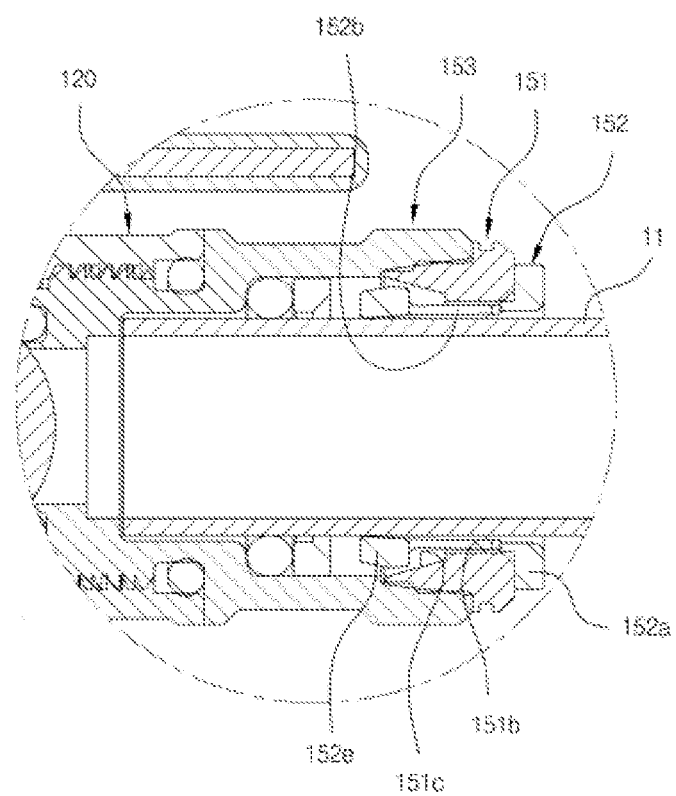
FIG. 13 is an enlarged vertical cross sectional view illustrating a manifold type pipe structure according to the present invention.
Figure 14:
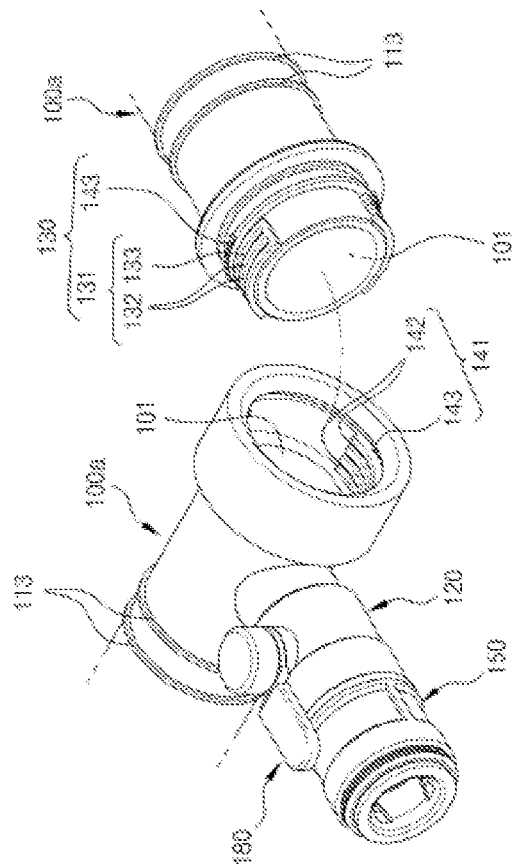
FIG. 14 is a disassembled perspective view illustrating an engaged state of a joint coupler of a manifold type pipe structure according to the present invention.
Figure 15:
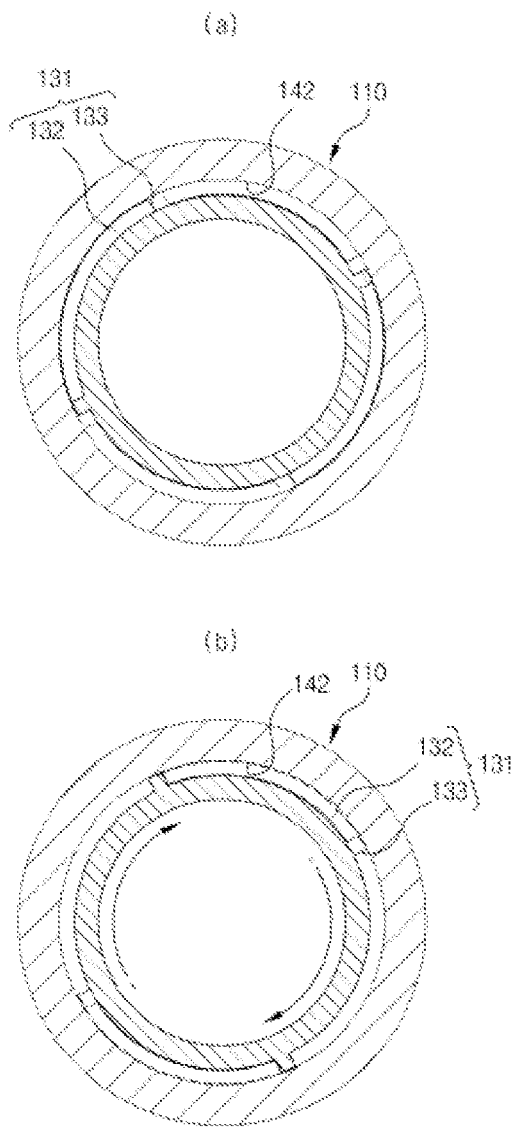
FIGS. 15A and 15B are cross sectional views illustrating an engaged state of a joint coupler of a manifold type pipe structure according to the present invention.
Figure 16:
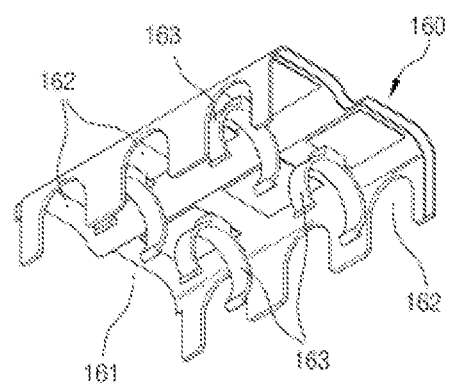
FIGS. 16A and 16B are perspective views illustrating indicating portions of a manifold type pipe structure according to the present invention.
Figure 16:
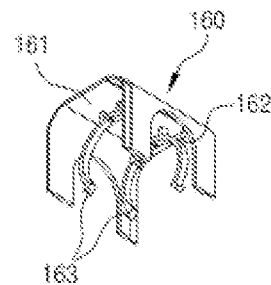
Figure 17:
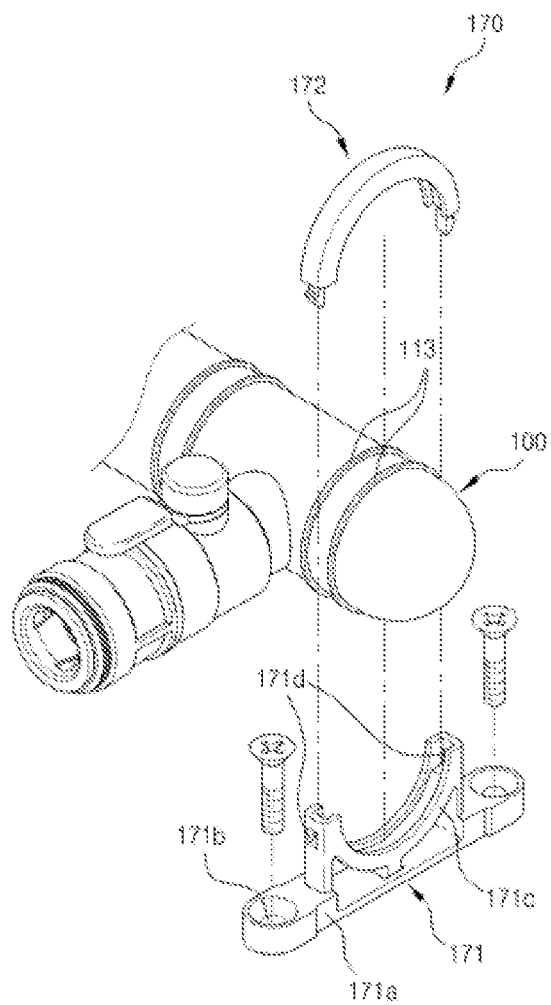
FIG. 17 is a perspective view illustrating a fixing portion of a manifold type pipe structure according to the present invention.
Figure 18:
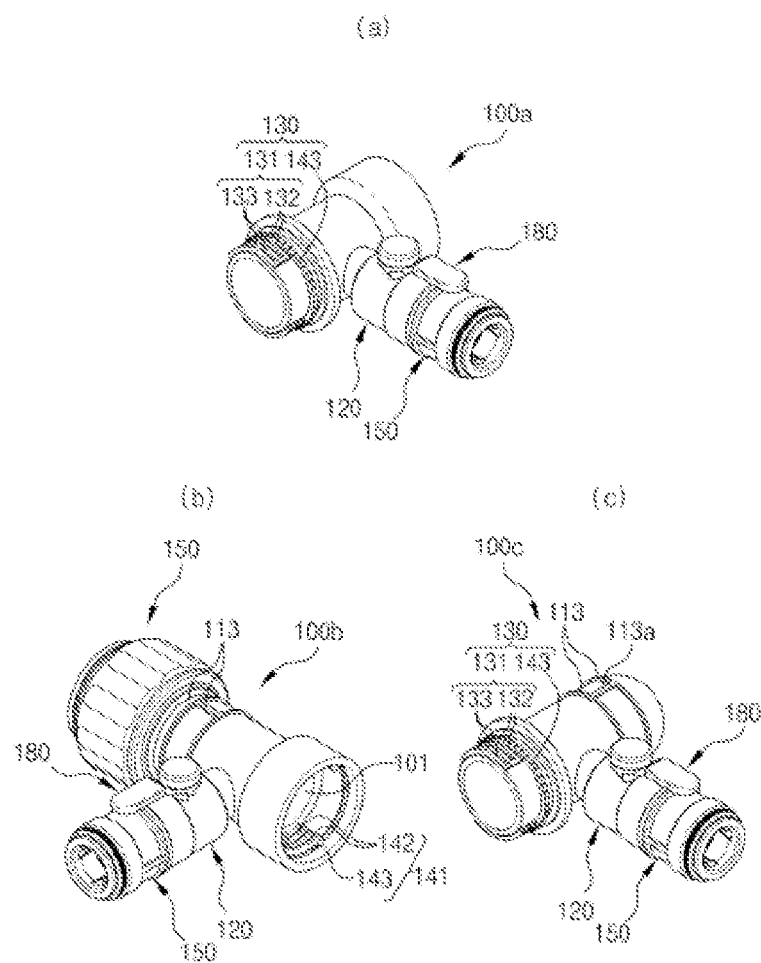
FIGS. 18A, 18B and 18C are perspective views illustrating a manifold type pipe structure according to another embodiment of the present invention.
Figure 19:
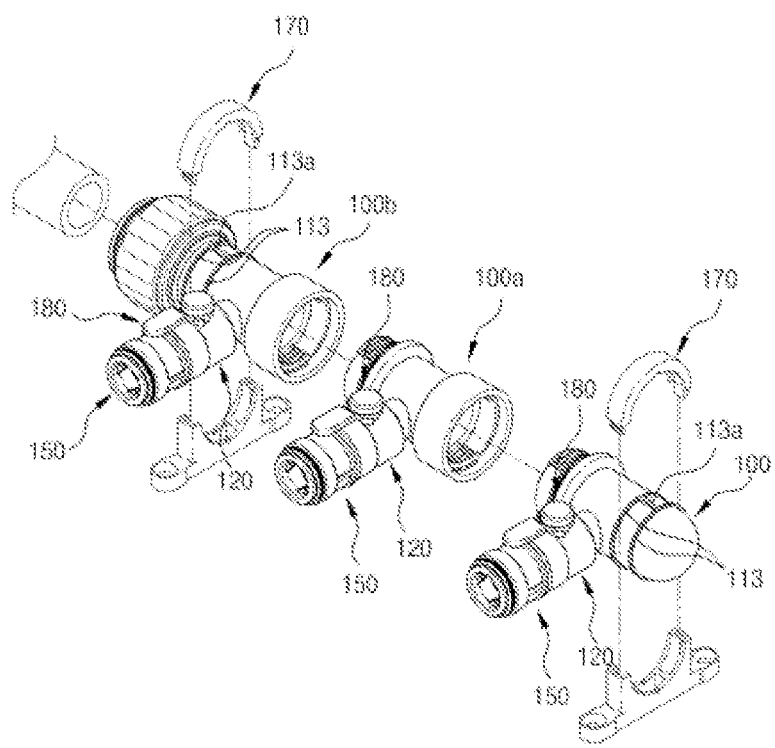
FIG. 19 is a perspective view illustrating an engaged state of a manifold type pipe structure according to another embodiment of the present invention.

FIG. 1 is a perspective view illustrating a joint coupler of a manifold type pipe structure according to the present invention. FIG. 2 is a perspective view illustrating a pipe coupler of a manifold type pipe structure according to the present invention. FIG. 3 is a perspective view illustrating a finishing coupler of a manifold type pipe structure according to the present invention. FIG. 4 is a perspective view illustrating a pipe coupler of a manifold type pipe structure according to a first embodiment of the present invention. FIG. 5 is a perspective view illustrating a pipe coupler of a manifold type pipe structure according to a second embodiment of the present invention. FIG. 6 is a partially disassembled perspective view illustrating a joint coupler of a manifold type pipe structure according to the present invention. FIG. 7 is a view of a use state of a pipe coupler of a manifold type pipe structure according to the present invention. FIG. 8 is a perspective view illustrating a manifold type pipe structure with one branch pipe in a manifold type pipe structure according to the present invention. FIG. 9 is a cross sectional view illustrating a manifold type pipe structure according to the present invention. FIG. 10 is a cross sectional view illustrating a state before an engagement of a connection valve connected to a pipe in a manifold type pipe structure according to the present invention. FIG. 11 is a cross sectional view illustrating a state after an engagement of a connection valve connected to a pipe in a manifold type pipe structure according to the present invention. FIG. 12 is a vertical cross sectional view illustrating a manifold type pipe structure according to the present invention. FIG. 13 is an enlarged vertical cross sectional view illustrating a manifold type pipe structure according to the present invention. FIG. 14 is a disassembled perspective view illustrating an engaged state of a joint coupler of a manifold type pipe structure according to the present invention. FIG. 15 is a cross sectional view illustrating an engaged state of a joint coupler of a manifold type pipe structure according to the present invention. FIG. 16 is a perspective view illustrating an indication portion of a manifold type pipe structure according to the present invention. FIG. 17 is a perspective view illustrating a fixing portion of a manifold type pipe structure according to the present invention.

As shown in FIGS. 1 to 17, the manifold type pipe structure 10 according to the present invention is configured in such a way that at least one branch pipe 120 is formed at a pipe passage 110 having a flow hole 101 through which liquid flows, and an input coupling part 130 is formed at an end of the pipe passage 110, and a joint coupler 100a forming an output coupling part 140 is disposed at the other end of it, and the output coupling part 140 of the joint coupler 100a of the other portion is jointed and connected at a limited rotation angle at the input coupling part 130 of the joint coupler 100a which is preferably by more than at least one.

The joint coupler 100a is configured to change the purpose of its use by selectively installing or sealing a connection valve 150 at both sides of the joint coupler 100a depending on the purpose of its use.

In other words, the manifold type pipe structure 10 might be applied for multiple purposes depending on the purpose of its use, but the occasion that it is preferably applied to the pipes of the boiler in the present invention will be described.

When the pipes are divided from a boiler pipe into independent spaces, respectively, the sub pipes are divided from the main pipe connected with the boiler.

In the conventional art, a branch pipe part to which a plurality of branch pipes 120 are welded is prepared for the purpose of separating pipes from the main pipe, and threads are formed at both sides of the pipe and the main pipe, and as they are coupled with each other, the branch pipes are engaged.

At this time, the operation for the purpose of coupling to the main pipe by rotating the branch pipes might be interfered with surrounding objects, so it is hard to easily joint and couple the pipes.

In the present invention, the joint coupler 100a of the branch pipe structure 10 is used for the same purpose depending on the number of the branch pipes 120 for thereby achieving selective multiple couplings.

Here at least one branch pipe 120 might be formed at the joint coupler 100a, and the number of it is selective, and preferably three branch pipes 120 are used.

The present invention might be applied to the branch pipe with universal purposes of uses in such a way to install the connection valve 150 at both sides or at one side of the joint coupler 100a or to seal the inner surface of it.

First, as shown in FIG. 2, the joint coupler 100a comprises a pipe coupler 100b for the purpose of a joint connection with a pipe, and the pipe coupler 100b is configured in such a way that at least one branch pipe 120 is disposed at the pipe passage 110 with the flow pipe 101 through which liquid flows, and the connection valve 150 is installed at an endof the branch pipe 120, and the connection valve 150 coupling the pipes is disposed at an endof the pipe passage 110, and the output coupling part 140 is disposed at the other portion of it.

The pipe coupler 100b makes it possible to have an inter joint connection by installing a connection valve 150 at one side of the pipe passage 110 to be connected with the pipe connected with the boiler, and at the other side is installed an output coupling part 140 in order for the joint coupler 100a of the other place to be jointed, so the branch pipes can be continuously jointed.

Second, as shown in FIG. 3, there is further provided a finishing coupler 100c connected with the joint coupler 100a, and the finishing coupler 100c has at least one branch pipe 120 at the pipe passage 110 which has a flow hole 101 flowing fluid in the interior of it, and a connection valve 150 is disposed at an endof the branch pipe 120, and the input coupling part 130 is disposed at an end of the pipe passage 110 for thereby achieving a joint connection at a limited rotation angle with respect to the output coupling part 140 of the joint coupler 100a or the pipe coupler 100b, and the other end of it is closed.

The finishing coupler 100c is jointed to the output coupling part 140 of the joint coupler 100a of the other place, and when the joint coupler 100a is no more coupled, and when the installation of the pipe connected with the boiler is not extended, the finishing coupler 100c is used for the purpose of finish of the manifold type pipe structure 10.

Third, as shown in FIG. 5, the pipe coupler 100b is further configured in such a way that at least one branch pipe 120 is formed at the pipe passage 110 having a flow hole 101 through which fluid flows, and the connection valve 150 is installed at an end of the branch pipe 120, and a connection valve 150 helping engage the pipes is formed at both sides of the pipe passage 110.

The pipe coupler 100b helps further extend the pipes to the spaces except for the places divided from the joint coupler 100a or the pipe coupler 100b and the finishing coupler 100c in such a way to install the connection valve 150 at both sides for thereby coupling, at both sides, the pipe connected with the boiler.

Fourth, as shown in FIG. 4, the pipe coupler 100b is configured in such a way that at least one branch pipe 120 is formed at the pipe passage 110 having a flow hole 101 through which fluid flows, and the connection valve 150 is installed at an end of the branch pipe 120, and a connection valve 150 helping couple the pipe is formed at an end of the pipe passage 110, and the other end is sealed.

The pipe coupler 100b is used when the places when the branch pipe 120 is needed are less as the joint coupler 100a is not needed. One side of the pipe coupler 100b is coupled with the pipe jointed with the boiler, and the other end of it is sealed, so the joint coupler 100a is no longer coupled. When the pipe connected with the boiler is not extended, it is used for the purpose of the last finishing work of the manifold type pipe structure 10.

The present invention might be applied to the manifold type pipe structure 10 with various applications in such a way to install or close the connection valve 150 at both sides or at an end of the joint coupler 100a with the joint coupler 100a of the manifold type pipe structure 10 being adapted as a basic structure.

The input coupling part 130 and the output coupling part 140 applied from the manifold type pipe structure 10 having various types are configured as follows.

As shown in FIGS. 14 and 15, the input coupling part 130 forms a coupling portion 131 at regular intervals on the outer surface of one end of both ends of the pipe passage 110, and the coupling portion 131 forms an engaging protrusion 132 with a curvature of an outer surface of the pipe passage 110, and the engaging protrusion 132 is provided in multiple numbers and is disposed at regular intervals, so the engaging space 133 is formed between the engaging protrusions 132, and the engaging space 133 positioned opposite to the rotation direction of the pipe passage 110 is sealed.

The output coupling part 140 forms an engaging portion 141 at regular intervals on an outer surface of one side of both sides of the pipe passage 110, and the engaging portion 141 forms a plurality of coupling protrusions 142 at intervals with a curvature of an inner surface of the pipe passage 110.

When the input coupling part 130 and the output coupling part 140 are inter-jointed, the coupling protrusion 142 of the input coupling part 130 is inserted up to the sealed portion of the engaging space 133, so the input coupling part 130 and the output coupling part 140 are connected with each other with a limited rotation angle.

In particular, the locking protrusion 143 is formed at an inner surface of the opening of the pipe passage 110 where the coupling portion 131 is formed and at the backside of the engaging portion 141, so the locking protrusion 143 is inter-engaged when connecting the input coupling part 130 and the output coupling part 140 for thereby maintaining a connected state.

Finally, the input coupling part 130 and the output coupling part 140 are inter-connected, and are rotated with a limited rotation angle of below 90°, so the coupling protrusion 142 of the output coupling part 140 is inserted into the engaging space 133 of the input coupling part 130 for thereby obtaining an inter-connection engagement.

The engaging space 133 formed by means of the engaging protrusion 132 of the input coupling part 130 and the engaging protrusion 142 of the output coupling part 140 are formed in spiral shapes with certain curvatures, so they are lead-movable by means of the rotation after they are inter-connected.

With the above-mentioned construction, an oil ring is engaged to an outer surface of the input coupling part 130 for the purpose of ensuring sealing performance by means of the engagement of the input coupling part 130 and the output coupling part 140, so the oil ring can be pressurized on an end of the inner surface of the output coupling part 140.

In addition, the locking protrusions 143 are inter-engaged by means of the lead movement as the input coupling part 130 and the output coupling part 140 rotate with limited angles for thereby preventing the loosening of the input coupling part 130 and the output coupling part 140.

Each locking portion is sloped in one direction and is inter-engaged, so the input coupling part 130 and the output coupling part 140 no longer separate, and it might be formed in an arc shape or a triangle shape so that it can separate only when a certain level force is applied from a friction force as they are engaged.

As shown in FIGS. 10 and 11, the connection valve 150 is an element for the purpose of fixing after a hollow circular pipe is engaged.

The connection valve 150 adapted to the pipe coupler 100b is formed of a coupling portion 151 and a pressurizing portion 152.

The coupling portion 151 has a female thread 151a on an inner surface for an engagement with the male thread 111 formed on an outer surface of the pipe passage 110, and as an engaging hole 151b having a multi-stepped inner surface at the inner center for the purpose of communicating with the flow hole 101, and at the center of the engaging hole 151b is formed a first slope surface 151c having a shoulder, and from an end of the engaging hole 151b is continuously protruded a plurality of engaging protrusions 151d. When it is engaged to the male thread 111 of the pipe passage 110, it is engaged with the fixing shoulder 112 formed at the backside of the male thread 111.

The pressurizing portion 152 has a support shoulder 152a at an outer surface of one side for the purpose of being inserted into the engaging hole 151b, and the pressurizing piece 152e having a pressurizing space 152b passing through the interior is partially cut away at regular intervals, and the pipe is inserted into the pressurizing space 152b, and when the pipe is pulled in a reverse direction, the pressurizing piece 152e is inwardly inserted into the first slope surface 151c and is inwardly contracted and pressurizes the outer surface of the pipe 11 for thereby obtaining a connection between the pipe passage 110 and the pipe.

As shown in FIG. 12, the connection valve 150 is installed at the branch pipe 120 and serves to engage the manifold type pipe structure.

The connection valve 150 adapted to the branch pipe 120 is formed of a connection portion 153, a coupling portion 151 and a pressurizing portion 152.

The connection portion 153 is coupled to communicate with an inner surface of the branch pipe 120.

The coupling portion 151 is engaged to an end of the connection portion 153, and at its inner surface is formed an engaging hole 151b having a multi-stepped inner surface, and at the engaging hole 151b is formed a first slope surface 151c.

The pressurizing portion 152 has a support shoulder 152a formed at an outer surface of one side of it for the purpose of being inserted into the engaging hole 151b, and the pressurizing piece 152e having a pressuring space 152b passing through the interior is partially cut away at regular intervals, and when the pipe is inserted into the pressurizing space 152b, it is inserted into the interior between the engaging holes 151b, and the pressurizing piece 152e pressurizes the outer surface of the pipe passage 110, and the end of the pressurizing piece 152e is caught at the first slope surface 151c of the engaging portion 151, so the pipe passage 110 and the pipe 11 are jointed and connected.

As shown in FIG. 16, there is further provided an indication portion 160 which is engaged to an outer surface of the pipe passage 110 for the purpose of indicating an installed place of the branch pipe 120.

The indication portion 160 comprises a main passage 161 of which a lower side is open and which has a space in a longitudinal direction, a sub passage 162 which is formed depending on the number of the branch pipes 120 in a horizontal direction from the main passage, and a clip 163 which is partially cut away in a vertical and downward direction at the center of the main passage for thereby being elastically engaged to the outer surface of the pipe passage 110.

The clip 163 might have varying lengths when the number of the sub passages 162 is determined depending on the number of the branch pipes 120.

The clip 163 is elastically engaged and fixed at an outer surface of the manifold type pipe structure 10 to which a joint coupler 100a, a pipe coupler 100b and a finishing coupler 100c are selectively applied.

On the upper surface of the indication portion 160, the kinds of the pipes and the names of the connected pipes of the branch pipes 120 are written, so the connection destinations of the pipes connected to the branch pipe 120 by means of the connection valve 150 can be easily recognized, and the on/off of the distribution states of a corresponding branch pipe 120 can be controlled by means of the ball valve 180.

As shown in FIG. 17, the manifold type pipe structure 10 of the present invention is closely fixed on the ground or the wall with the aid of the fixing portion 170 for thereby maintaining an airtight state and installation of the jointed manifold type pipe structure even an external impact is applied to it.

The fixing portion 170 includes a lower fixture 171 formed of a bracket 171a having a fixing hole 171b fixed on the ground or the wall and a fixing groove 171d which is integrally formed with the bracket 171a and is formed at both sides of the holder 171c the upper side of which is open, and a upper fixture 172 the lower side of which is open so that it can be engaged from the upper side of the outer surface of the space between a pair of the fixing shoulders 113 formed on the outer surface of the pipe passage 110 and is configured in order for the fixing protrusion 172a formed at both sides of the lower side to be inserted into the fixing groove 171d.

The thusly constructed fixing portion 170 is fixed on the ground or the wall with an anchor bolt by way of the fixing hole 171b formed at the bracket 171a and is integrally formed with the bracket 171a, so that the semi-grooved holder 171c the upper side of which is open is positioned between the fixing shoulders 113 of the manifold type pipe structure 10.

Afterward, the upper fixture 172 is engaged from the upper side of the outer surface of the manifold type pipe structure 10, and the opened lower side of the upper fixing portion 170 is engaged to match with the holder 171c, and the fixing protrusion 172a formed at the upper fixture 172 is elastically inserted into the fixing groove 171d of the lower fixture 171 for thereby maintaining an inter-fixed state.

As shown in FIGS. 18A, 18B, 18C and 19, the manifold type pipe structure according to another embodiment of the present invention will be described below.

The locking protrusions 143 formed at the joint coupler 100a, the pipe coupler 100b and the finishing coupler 100c are formed on the whole outer surfaces of the coupling portion 131, and the inner surface of the backside of the coupling portion 141 might be formed at regular intervals for thereby achieving an airtight connection state.

The locking protrusion 143 might be formed in one shape among a triangle shape, a quadrangle shape and a semi-groove shape, and the shape of it is not limited only when it has the engaging structure.

A joint fixing shoulder 113a is further formed at an upper aide of a pair of the fixing shoulders 113 forming the outer surface of the pipe passage 110, so the joint fixing shoulder 113a can be inserted into the joint groove 173 formed at an inner surface of the upper fixture 171 when the upper fixture 171 and the lower fixture 172 are engaged between a pair of the fixing shoulders 113.

With the above mentioned structure, the joint connections of the manifold type pipe structure 10 connected in multiple numbers can be more supported in such a way to prevent the distortions of the fixing portion 170 and the manifold type pipe structure 10.

Finally, the joint coupler 153, the finishing coupler 153 and the pipe coupler 100b are made from an engineering plastic material which has good thermal, impact and abrasion resistances. The material of it is not limited, and as long as the material has a good thermal resistance, it can be used.

Being different from the common plastic, the engineering plastic is strong against impact, abrasion, heat, cold, chemicals and fatigue in addition to good strength and elasticity and has good electric conductions.

The above mentioned engineering plastic is selected from at least one of the groups comprising polyamide, polyester, polycarbonate, polyterephthalic acid butylene and poly oxide phenylene.

The thusly adapted joint coupler 153, the finishing coupler 153 and the pipe coupler 100b have good strength, elasticity, hardness, elongation, density and formality.

The invention claimed is:

1. A manifold type pipe structure, comprising:
at least one branch pipe formed at a pipe passage having a flow hole through which fluid flows;
a first joint coupler, comprising:
an input coupling part formed at a first end of the pipe passage, and an output coupling part formed at a second end of the pipe passage;
a second joint coupler comprising an output coupling part to be joint-connected with a limited rotation angle at the input coupling part of the first joint coupler; and
a fixing portion for installing the pipe passage on a ground or a wall,
wherein said input coupling part forms a coupling means disposed at an outer surface of the first end of the pipe passage, and said coupling means forms a plurality of engaging protrusions disposed in a curvature direction of an outer surface of the pipe passage to be spaced apart at predetermined intervals to form an engaging space between each of the plurality of engaging protrusions, and the second end of the pipe passage is open and the first end of the pipe passage is sealed, and said output coupling part of the second joint coupler forms an engaging means at the first side of the pipe passage, and said engaging means forms a plurality of coupling protrusions to be spaced apart in a curvature direction of an inner surface of the pipe passage, and when the input coupling part and the output coupling part of the second joint coupler are joint-connected, the plurality of coupling protrusions of the output coupling part are inserted up to the sealed portion of the engaging space, so the input coupling part and the output coupling part of the second joint coupler are coupled with a limited rotation angle, and a locking protrusion is formed at an inner surface of the opening of the pipe passage where the coupling means is formed and at a backside of the engaging means to maintain a joint state as the locking protrusions are engaged when jointing the input coupling part and the output coupling part of the second joint coupler,
wherein said fixing portion includes a bracket having a fixing hole on the ground for being fixed on the ground or a wall; a lower fixture integrally formed with the bracket and forms a fixing groove at both sides of a holder of which an upper side is open; and an upper fixture of which a lower side is open to be engaged from an upper side of an outer surface of the space between a plurality of fixing shoulders of the outer surface of the pipe passage, with a fixing protrusion formed at both sides of a lower side of the upper fixture being inserted into the fixing groove,
wherein the plurality of fixing shoulders can be inserted into a joint groove formed at an inner surface of the upper fixture when the upper fixture and the lower fixture are engaged between the plurality of fixing shoulders.

2. The manifold type pipe structure according to claim 1, wherein said first joint coupler includes a pipe coupler for achieving a joint connection with at least one of a plurality of piers, and wherein said pipe coupler forming at least one branch pipe at the pipe passage having a flow hole through which fluid flows, with a connection valve being installed at an end of the branch pipe, with a connection valve being formed at an end of the pipe passage for the purpose of engaging the pipes, with an output coupling part being formed at the other end of the pipe passage.

3. The manifold type pipe structure according to claim 2, wherein said pipe coupler includes at least one branch pipe at a pipe passage having a flow hole through which fluid flows, with a connection valve being installed at an end of the branch pipe, with a connection valve being formed at an end of the pipe passage for engaging the pipes, the other end being configured to seal the flow hole.

4. The manifold type pipe structure according to claim 2, wherein said pipe coupler forms at least one branch pipe at a pipe passage having a flow hole through which fluid flows, a connection valve formed at an end of the branch pipe, with a connection valve being formed at both ends of the pipe passage for engaging the pipes.

5. The manifold type pipe structure according to claim 2, wherein said connection valve comprises:
a coupling portion which is configured to have a female thread on an inner surface to be engaged with a male thread formed on an outer surface of the pipe passage, and an engaging hole having a multi-stepped inner surface is formed at the center of the inner surface to communicate with the flow hole, and at the center of the engaging hole is formed a first slope surface having a shoulder, and at an end portion of the engaging hole are continuously formed a plurality of engaging protrusions, and when being engaged to the male thread of the pipe passage, the coupling portion is engaged with a fixing shoulder formed at a backside of the male thread; and
a pressurizing portion which is configured in such a way that a support shoulder is formed at an outer surface of one side so as to be inserted into the engaging hole, and a pressurizing piece having a pressurizing space passing through the interior is partially cut away at regular intervals for thereby inserting the pipe into the pressurizing space, and then when the pipe is pulled in a reverse direction, the pressurizing piece is inserted into the first slope surface and is inwardly contracted for thereby pressurizing an outer surface of the pipe 11, so the pipe passage and the pipe are jointed and connected.

6. The manifold type pipe structure according to claim 2, wherein said connection valve comprises:
a connection portion engaged to communicate with an inner surface of the branch pipe;
an coupling portion which is coupled at an end portion of the connection portion and has an engaging hole having a multi-stepped surface at an inner surface and forms a first slope surface at the engaging hole; and
a pressurizing portion which has a support shoulder at an outer surface of one side to be inserted into the engaging hole, and a pressurizing piece having a pressurizing space passing through the interior is partially cut away at regular intervals, and when the pipes are inserted into the pressurizing space, the pressurizing piece comes into the interior from the engaging space, and the end of the pressurizing piece is caught at the first slope surface of the engaging part, so the pipe passage and the pipes are jointed and connected.

7. The manifold type pipe structure according to claim 1, further comprising:

a finishing coupler which is connected with the first joint coupler, wherein said finishing coupler forms at least one branch pipe at a passage pipe having in its interior a flow hole through which liquid flows, with a connection valve being installed at an end of the branch pipe valve, with the input coupling part being formed at an end of the pipe passage for thereby being joint-connected with a limited rotation angle with the output coupling part of the second joint coupler or the pipe coupler, the other end of the pipe passage being closed.

8. The manifold type pipe structure according to claim 1, further comprising an indication portion which is engaged to an outer surface of the pipe passage for indicating a connection place of the branch pipes, wherein the indication portion comprises:

a main passage of which a lower side is open and which has a space in a longitudinal direction;

a sub passage which is formed depending on the number of the branch pipes in a horizontal direction from the main passage; and a clip which is partially cut away in a vertical and downward direction at the center of the main passage for thereby being elastically engaged to an outer surface of the pipe passage.

9. The manifold type pipe structure according to claim 1, wherein said first joint coupler, said finishing coupler and said pipe coupler are made from at least one of the groups comprising polyamide, polyester, polycarbonate, polyterephthalic acid butylene and poly oxide phenylene.

* * * * *